Oct. 28, 1969  D. G. FAWKES  3,475,007
SKEWED SEAT BUTTERFLY VALVE
Filed Aug. 19, 1966
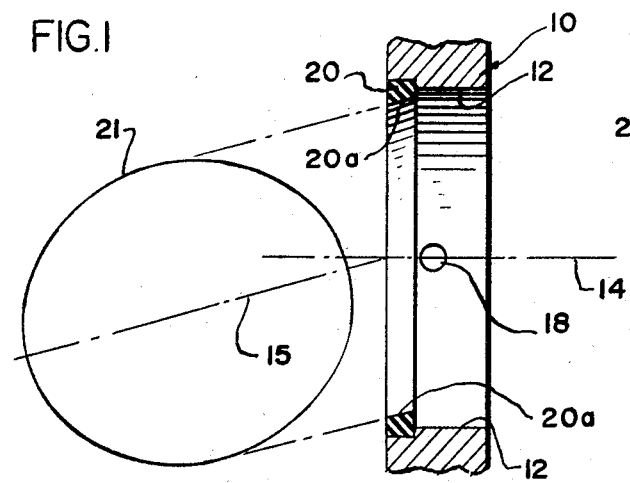
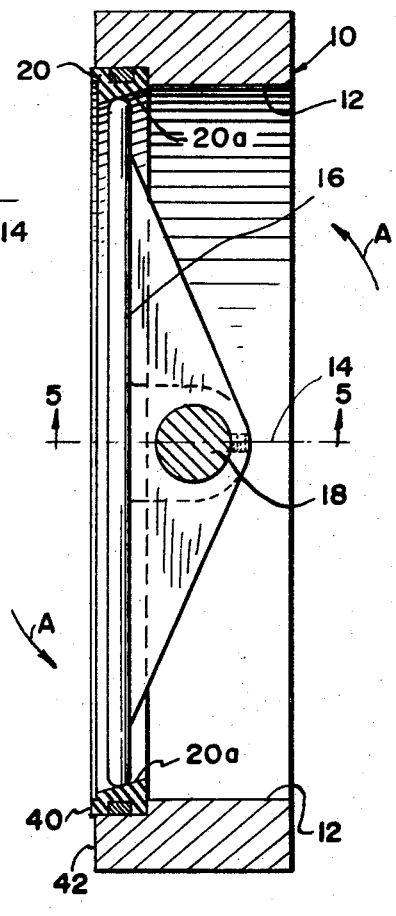
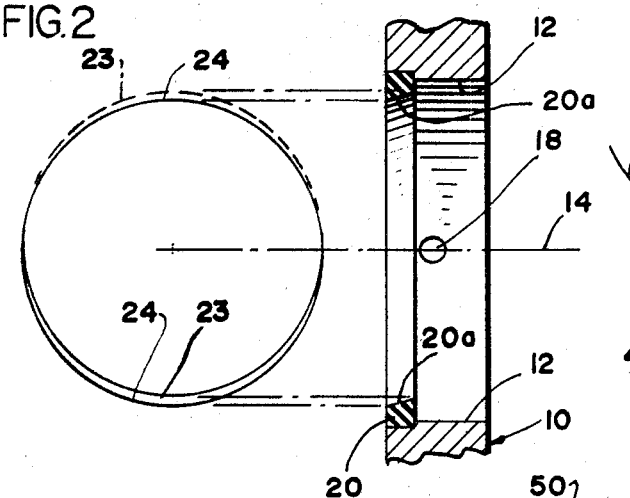
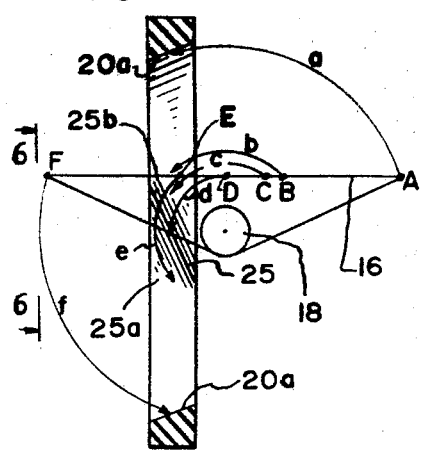
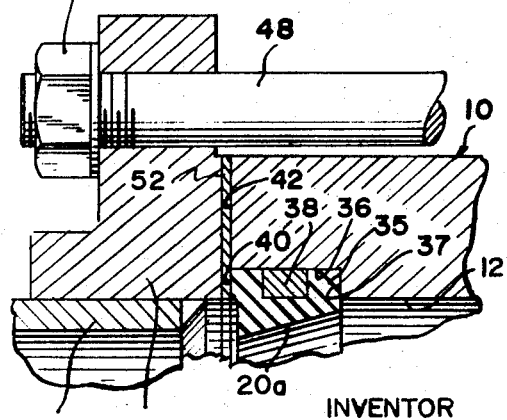
INVENTOR
DONALD G. FAWKES.
BY
ATTORNEYS.

United States Patent Office 3,475,007
Patented Oct. 28, 1969

3,475,007
SKEWED SEAT BUTTERFLY VALVE
Donald G. Fawkes, Aurora, Ill., assignor to Henry Pratt Company, a corporation of Delaware
Filed Aug. 19, 1966, Ser. No. 573,518
Int. Cl. F16k 5/04, 25/00
U.S. Cl. 251—305                          8 Claims

ABSTRACT OF THE DISCLOSURE

A butterfly valve which includes a valve body having a longitudinal center line along a flow path through the valve and a shaft across the body normal to its center line. A disc is mounted for rotation upon the shaft and is offset relative to the shaft. The disc has a circular periphery in a plane parallel to the shaft. A valve seat surface is formed around the interior of the valve body for engagement with the periphery of the disc in valve closed position. The valve seat surface comprises a section of an elliptical cylinder which has a center line intersecting the center line of the valve body and diverging at an acute angle thereto, the center line of the elliptical cylinder laying in a plane parallel to the shaft axis and intersecting the center line of the valve body, the major axis of the elliptical seat section being generally parallel to the shaft axis.

BACKGROUND AND SUMMARY OF THE INVENTION

The valve of this invention comprises a valve housing having a generally circular cylindrical bore about a center line providing a fluid passage through the housing, a valve seat surface formed in the housing, the seat surface having the shape of a section of an elliptical cylinder about a center line which extends at an acute angle to the center line of the fluid passage, and a closure member with a circular periphery to seat on the seat surface, the closure member being pivotally mounted in the housing for movement approximately 90° between the valve open and the valve closed positions.

The valve of this invention has a replaceable seat which is molded outside the body of the valve and readily replaceable in the field as well as in original manufacture. The seat material may be rubber, synthetic rubber, or of various known polymer materials chosen primarily to be compatible with the fluids being conducted in the lines incorporating the valve. The use of the valve in industrial applications can thus be tailored quite easily to each particular application.

The valve of this invention provides a novel elliptical cylindrical seating surface which is so oriented relative to the valve disc as to permit the disc to seat tighter as the disc is rotated further into the closed position, yet the valve disc does no adversely effect the seat surface itself nor cause any change in the seating tightness of the valve seat with the valve disc edge after repeated cycles of opening and closing. This novel structure permits the valve disc to be wedged onto and lifted off of the valve seat rather than sliding thereon when moved between its closed and open positions. The disc edge has a circular shape and is of the size of a circle cut by a plane passing through the elliptical valve seat surface at an acute angle to the center line of the surface such that the plane and surface intersection line would be a true circle.

The principal object of this invention is to provide a new and improved valve.

Another object of this invention is to provide a new and improved butterfly valve seat structure.

A further object of this invention is to provide a novel elliptical cylindrical buterfly valve seat in which the mating parts of the closure and valve housing are so arranged that the closure is in effect lifted out of the seat of the valve upon movement toward opening from fully closed position.

More particularly, the principal feature of this invention which carries with it the above objects and advantages is the provision of a novel elliptical cylindrical valve seat surface for butterfly valves of the character described.

Further objects, features and advantages of the present invention will be apparent from the following description of the preferred embodiment illustrated in the accompanying drawings.

DESCRIPTION OF THE DRAWINGS

FIGURE 1 is a fragmentary, diagrammatic central sectional view through the valve housing and valve seat normal to the axis of the closure disc, with a development of the elliptical cylindrical valve seat surface as intersected by a plane perpendicular to the elements thereof;

FIGURE 2 is a fragmentary, diagrammatic central sectional view as in FIG. 1, with a development of the surface as intersected by planes perpendicular to the center line of the fluid passage and parallel to the closure disc when in closed position;

FIGURE 3 is a central sectional view through the assembly of the valve housing and valve disc as in FIG. 1, with the closure disc illustrated in its closed position;

FIGURE 4 is an enlarged partial sectional view of the valve seat area illustrating the means for installing one embodiment of the valve seat of this invention in a valve housing with an adjacent pipeline flange assembled with the valve;

FIGURE 5 is a diagrammatic central sectional view taken generally along the line 5—5 of FIG. 3 and diagrammatically illustrating the path of movement of various points along the closure disc on movement between open to fully closed positions of the disc; and FIGURE 6 is a partial diagrammatic elevation view of the cylindrical valve seat at a terminus of its minor axis.

DETAILED DESCRIPTION OF THE INVENTION

The present invention generally involves a butterfly valve and is illustrated in a form including a valve housing shown generally at 10 having a fluid passage 12 therethrough about a longitudinal center line 14, which will coincide usually with the center line of piping in which the valve is installed. The valve housing 10 may be made with any desirably formed or specially shaped ends to mate with suitable piping or other equipment. The housing 10 of the valve preferably is formed of metal, the illustrated embodiment being an iron or steel casing. The valve housing 10 may be formed of various cast metals or of fabricated materials economical and suitable for use in the particular service for which the valve is intended.

A valve closure disc 16 is rotatably mounted in the housing on a shaft 18 normal to the fluid passage center line 14. The disc is offset from the shaft so that its presents an uninterrupted 360° continuous periphery extending past the shaft where the shaft is journalled in the valve housing. The valve is illustrated in closed position in FIGS. 3 and 5 wherein it can be observed that there is continuous contact between the disc edge and the seat in the body. The valve seat is designated generally 20 and extends continuously about the interior of the valve housing 10 at a location spaced longitudinally along the fluid passage center line 14 to one side of the valve disc supporting shaft 18. The operative surface of the seat ring is an inwardly facing elliptical cylindrical surface 20a for cooperatively contacting the periphery of the closure disc 16 to close the valve when the disc is in its closed position (FIGS. 3 and 5).

In order to fully comprehend the manner in which a circular closure member (valve disc 16) may be seated on an elliptical cylindrical surface, it should be understood that the line of intersection of a circular cylindrical surface by a flat plane oriented obliquely to the elements and center line of the cylinder, produces an elliptical curve. Also, the intersection of an elliptical cylindrical surface by a flat plane passing through the cylinder at an an appropriate angle to the cylinder's elements, produces a circle. The present valve structure makes use of the latter situation in mating the seat surface and disc edge.

FIGURES 1 and 2 illustrate developments of the elliptical cylindrical valve seat surface of this invention as intersected by various planes and are helpful in understanding the principle of this invention. As shown in FIG. 1, the elliptical cylindrical valve seat surface 20a describes an elliptical cylinder about a center line 15 extending at an appropriate acute angle (about 12° in the figure (to the center line 14 of the fluid passage. A development 21 of the surface as intersected by a plane perpendicular to the elements of the cylinder produces the ellipse shown. The seat surface 20a is continuous throughout 360° and is generally of constant width between two parallel planes oblique to the elements of the elliptical cylinder of such surface and perpendicular to the fluid passage center line 14. The closure disc 16 when in its closed position will be generally parallel to the parallel planes. Referring to FIG. 2, it can be seen that developments 23 and 24 of the outer and inner edges, respectively, of the valve seat formed by the intersection of said parallel planes with the seat surface form circles of substantially the same diameter as the valve closure disc 16. In essence, although the seating surfce is elliptical in a direction oblique to the center line 14 of the fluid passage, every section cut by an imaginary flat plane perpendicular to the fluid passage center line 14 is theoretically a similar sized circle. The disc edge, being a circle only slightly larger than the circle intersections referred to on the seat surface, will contact the surface when turned into the seat for sealing purposes.

The operation of the valve can best be understood with reference to FIG. 3 where it can be seen that rotation of the closure disc 16 about the axis of shaft 18 causes the perimeter of the disc to approach and then seat on the elliptical surface 20a in a manner that the disc edge seats tighter as the disc is rotated further in the closed direction (arrows A, FIG. 3). In effect, the closure disc actually wedges onto the lifts off of the elliptical surface upon respective movement toward and away from seat surface 20a. There is thus established a tight seal to stop leakage and at the same time allow the closure member to be easily opened and closed without damaging or unduly wearing the valve seat and closure. The circular periphery of the disc may indent into the surface 20a by about ⅛ inch all around insuring sealing contact.

The major axis of the elliptical cylindrical surface is equal in length to the diameter of closure disc periphery (plus about ¼ inch diametrical interference above mentioned) so that the perimeter portions of the closure disc 16 at the extreme closed position of the disc maintain substantially constant contact with the seat surface 20a with the intended indenting of the disc edge into the seat material. Theoretically, the surface of the elliptical cylinder at the positions opposite the shaft 18 trunnions is a portion of a circular cylinder and lines across these opposite surface portions in the direction of the generatrix of the cylinder are parallel to the fluid passage center line 14. However, in practice, the preferred embodiment of the invention is shown in FIGS. 5 and 6 and modifies the theoretical surface such that the portions of the elliptical cylindrical surface opposite the shaft trunnions are shaped to form a crest 25 raised from the cylindrical surface and extending diagonally across the valve seat surface formed by the above mentioned section of the elliptical cylinder. The valve seat surface slopes away from the crest 25 on each side thereof forming surfaces 25a, 25b oblique to the elements of the cylinder so that the edge of the disc 16 opposite the shaft trunnions approaches and seats onto surfaces 25a, 25b in a wedging action. To better understand this seating action opposite the valve trunnions, various imaginary points A through F are shown in FIG. 5 along the edge of the disc 16. Points A and F at the edge of the disc farthest from the shaft 18 follow arrows a and f and seat on the seat surface 20a when the disc closes, as described above. Points B and C (on the right side of shaft 18 in FIG. 5) follow arrows b and c on closing of the disc and seat onto oblique surface 25b on the right side of crest 25. Point E (on the left side of shaft 18) follows arrow e, passes over crest 25 and seats onto oblique surface 25a on the opposite side of crest 25. And point D immediately opposite the shaft trunnion seats onto the center of crest 25. The crest also has the above mentioned ¼ inch diametrical interference so that point D on the disc edge maintains substantially constant contact when the disc is fully closed.

Referring to FIG. 4, one means for employing the principle of this invention is to form a continuous annular ring 35 having the inwardly facing valve seat surface 20a. The ring is received in a complementary annular 360° recess 36 in the valve housing 10. In the embodiment illustrated, the annular ring valve seat is rubber and has a metal reinforcing ring 38 molded into the rubber at the time the ring is molded. The combination seat ring and reinforcing ring has a slip fit into the annular recess 36 such that prior to mounting of the valve in a pipe line, one edge 40 of the seat 20 projects slightly (illustrated in FIG. 3) beyond face 42 of the housing. A pipe 44 having welded-on annular flange 46 may be bolted to a similar flange of a pipe on the opposite side of the valve body as by bolts 48. The bolts clamp the valve body between opposite flanges with usual nuts such as nut 50. The flange 46 is urged against the face 40 of the sealing ring 35 providing a static seal in the area of contact. The sealing ring is forced against the side 37 of the groove in the body receiving the ring producing a static seal in this area of contact between the ring and the body. Line fluid is prevented from passing behind the seat ring by the static seals. A gasket 52 may be interposed between housing 10 and flange 46.

It is preferred to make the seat ring with an extension to the face 40 which does extend radially inwardly to the seating surface 20a so that the clamping of the wafer type valve body between flanges may produce the static seals without distorting or otherwise affecting the shape of the surface upon which the disc edge is expected to seat. While the seat ring is shown herein as a separate molded member inserted in a valve body prepared to receive it, such a seating surface may be provided in valves in which the seat is not intended to be removed either by bending a separately manufactured ring in place in the body or by molding the ring in the valve body used as part of the mold. The cooperation of the disc edge and seat surface would be the same as described so long as the seat surface and disc edge are in the relative positions described.

While this invention is susceptible of embodiment in many different forms, there is shown in the drawings and has herein been described in detail one embodiment of the invention, with the understanding that the present disclosure is to be considered as an exemplification of the principles of the invention and is not intended to limit the invention to the embodiment illustrated. The scope of the invention will be pointed out in the appended claims.

I claim:
1. A butterfly valve comprising: a valve body having a longitudinal center line along a flow path through the valve, a shaft across the body normal to its center line, a disc mounted for rotation upon the shaft in the body, said disc being offset relative to the shaft and having a circular periphery in a plane parallel to the shaft, means forming a valve seat surface around the interior of the body in position to be contacted by the periphery of the disc in valve closed position, said surface being a section of an elliptical cylinder having a center line intersecting the center line of the valve body and diverging at an acute angle thereto, the center line of the elliptical cylinder laying in a plane parallel to the shaft axis and intersecting the center line of the valve body, the major axis of the elliptical seat section being generally parallel to the shaft axis, and the elements of the elliptical cylinder being at an acute angle to the center line of the valve body.

2. The butterfly valve of claim 1 wherein the valve seat surface formed by said section of the elliptical cylinder is continuous and of generally constant width between two parallel planes oblique to the generatrix and elements of the elliptical cylinder of which such surface is a section.

3. The butterfly valve of claim 2 wherein said parallel planes are parallel to said closure disc when in its closed position.

4. The butterfly valve of claim 1 wherein inwardly facing surface portions of said elliptical cylindrical surface most closely adjacent the shaft have means forming a crest extending diagonally across said section of the elliptical cylinder and surface portions sloping away from said crest oblique to the elements of said cylinder so as to face the valve disc as it moves toward the seat surface.

5. The butterfly valve of claim 1 wherein said valve seat is comprised of a continuous ring member received in a complementary annular 360° groove in said valve housing.

6. A butterfly valve, comprising: a valve housing having a longitudinal center line; means defining an elliptical cylindrical valve seat surface in said housing, the center line and the elements thereof all being oblique at an acute angle to the longitudinal center line of said housing; and a closure disc pivotally mounted in said housing on a shaft having an axis normal to the center line of the housing, said disc having a circular periphery and being offset to one side of said shaft, said closure disc extending across said valve seat surface to close the valve and being swingable approximately 90° away from said valve seat surface to open the valve, said disc periphery and valve seat surface having complementary contacting surfaces in valve closed position.

7. The butterfly valve of claim 6 wherein inwardly facing surface portions of said elliptical cylindrical surface are angled out of the elliptical surface at a slight angle so as to face the valve disc as it moves toward the seat surface.

8. The butterfly valve of claim 6 wherein said means defining said valve seat surface is comprised of a continuous annular ring member received in a complementary annular 360° groove in said valve housing.

References Cited
UNITED STATES PATENTS

| | | | |
|---|---|---|---|
| 621,362 | 3/1899 | McElroy | 251—306 X |
| 813,771 | 2/1906 | Bush | 251—306 X |
| 2,011,641 | 8/1935 | Kruse | 251—305 X |
| 3,000,069 | 9/1961 | Bryant | 251—306 |
| 1,624,891 | 4/1927 | Hutchinson et al. | 251—307 |

FOREIGN PATENTS 583,610  9/1933  Germany.

HENRY T. KLINKSIEK, Primary Examiner